May 30, 1967

F. L. CHALMERS ETAL 3,322,232

SEISMIC EXPLORATION

Filed Oct. 18, 1965

INVENTORS
FRANKLIN L. CHALMERS,
TOBIAS FLATOW,
BY John B. Davidson
ATTORNEY.

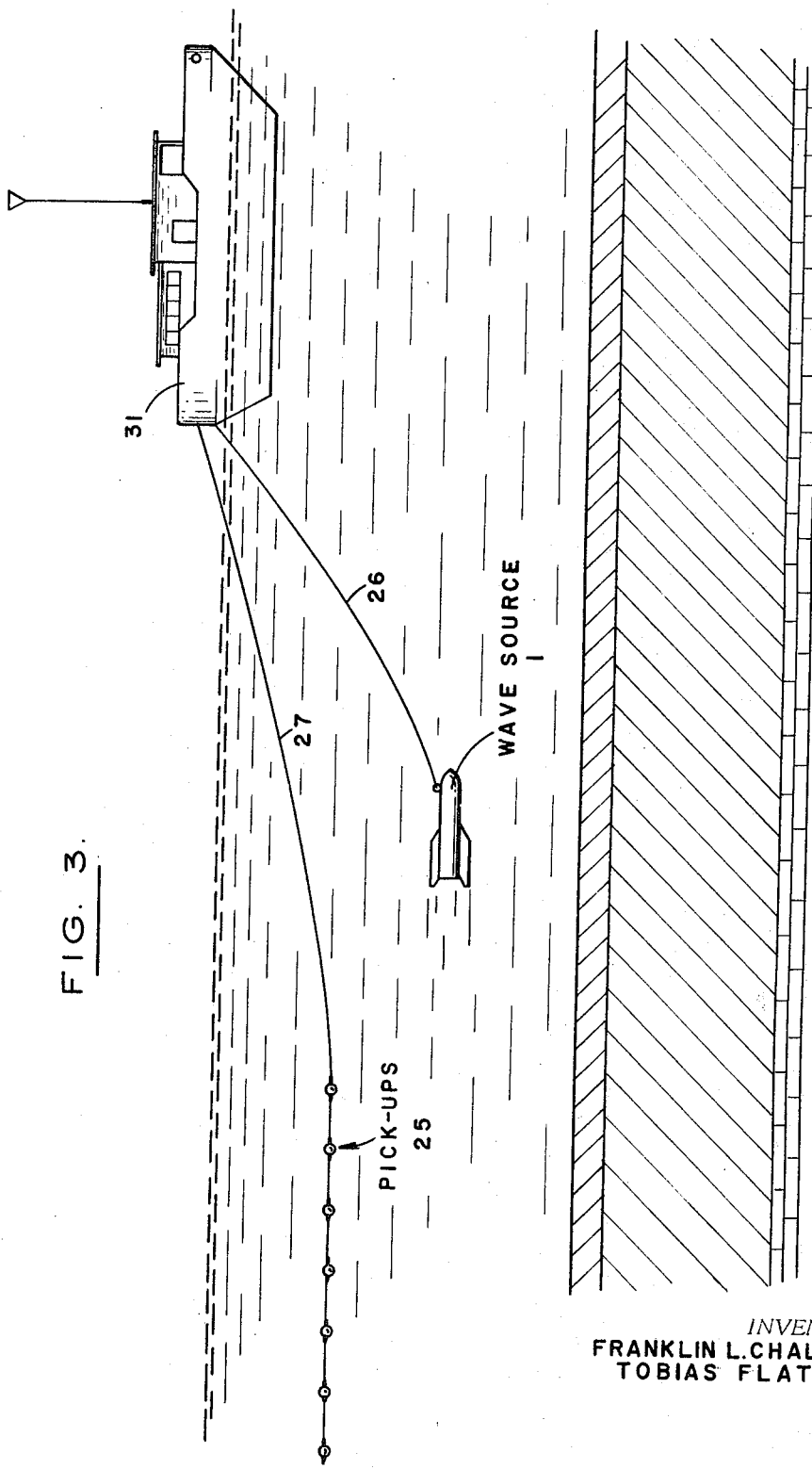

ns
3,322,232
SEISMIC EXPLORATION
Franklin L. Chalmers and Tobias Flatow, Houston, Tex., assignors to Esso Production Research Company, a corporation of Delaware
Filed Oct. 18, 1965, Ser. No. 496,760
4 Claims. (Cl. 181—.5)

This invention relates generally to seismic exploration, and more particularly to a source of seismic waves for use at marine locations.

One method of seismic surveying at marine locations utilizes a sound source which is towed through the water by a vessel and periodically activated to generate seismic impulses. The seismic impulses are detected by a plurality of seismic wave detectors, which are sometimes styled seisometers, geophones, hydrophones, etc., which are streamed behind the towing vessel. One type of sound source that has been utilized makes use of a compressed air line from the ship which is vented into the water through a sliding spool valve which is intermittently actuated in accordance with the buildup of a differential pressure across valve elements. While this particular type of seismic source produces an acceptable seismic impulse, shipboard personnel cannot control its operation in such a manner that the operation of recording equipment can be synchronized therewith.

Objects and features of the invention not apparent from the above discussion will become evident upon consideration of the following detailed description of the invention taken in connection with the accompanying drawings, wherein:

FIG. 3 is a schematic view illustrating the use of the invention while seismic surveying at a marine location.

Figure 1:
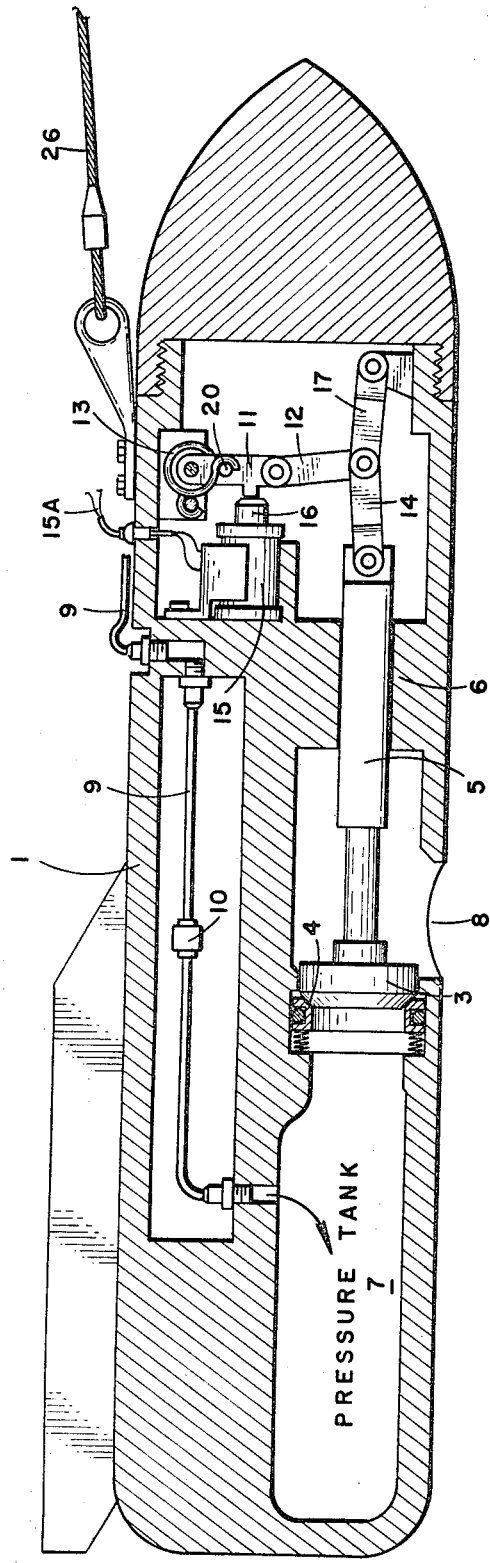
FIG. 1 is a cross-sectional view of a preferred embodiment of the invention in one of the operative positions thereof.

With reference now to FIG. 1, there is illustrated a housing member 1 including a high pressure tank or reservoir 7 which is coupled to a high pressure line which may lead to a high pressure gas source on a ship through a check valve 10 which permits pressurized gas to remain at high pressure in the tank when the pressurizing source on the ship has been disconnected or turned off. The high pressure reservoir 7 is coupled to a port 8 through which the pressurized gas in the tank may be dumped into the water surrounding the housing. Fluid communication between the reservoir 7 and the port 8 is controlled through a valve means including a compliant, spring-biased, annular floating valve seat 4 and a valve piston or cylinder 3. The valve seat 4 includes a recess on its outer surface for accommodating an O-ring or other sealing member for maintaining the seal while permitting longitudinal movement of the valve seat. When the piston or cylinder 3 is seated on the valve seat 4, the reservoir 7 is isolated from the port 8. Connected to the valve piston or cylinder 3 is a piston rod 5 which is supported by an annular guide 6. The valve piston 3 and rod 5 are held in the position illustrated in FIG. 1 by an overtravel locking linkage means including link members 11, 12, 14, and 17. Link members 14 and 17 are pivotally connected together and are respectively connected to one end of piston rod 5 and to the housing 1. Link members 11 and 12 are pivotally connected together and are respectively pivotally connected to the housing 1 and to the pivotal connection of link members 14 and 17. Link members 14 and 17 have a predetermined extended position as illustrated in FIG. 1 whereat valve piston 3 is urged into seating relationship with the valve seat 4. When link members 11 and 12 are in the most extended position thereof (i.e., along a straight line between the pivotal connection between members 11 and 17 and the pivotal connection of member 11 to the housing 1), the link members 14 and 17 are urged into the predetermined extended position thereof illustrated in FIG. 1.

A solenoid member 15 having an extensible armature 16 is supported by the housing 1 in such a position as to support members 11 and 12 in the most extended position thereof illustrated in FIG. 1. Actually, members 11 and 12 travel slightly overcenter to the left, as illustrated, so that pressure exerted on valve piston 3 and piston rod 5 by the pressure in reservoir 7 will be ineffective to move the piston cylinder and rod from the position illustrated in FIG. 1. However, when the solenoid is actuated or energized so as to move the armature to the position designated by the dotted line 16A in FIG. 2, the link members 11 and 12 will be shoved overcenter away from the straight line position thereof so that the pressure in the reservoir will be effective to unseat valve cylinder 3 from valve seat 4 and to move the valve cylinder and valve rod 5 to the position illustrated in FIG. 2, and to collapse the linkage members 11, 12, 14, and 17 to the position illustrated in FIG. 2. A coil spring 13 connected between the pivotal connection of link member 11 to housing 1 and to a stud 20 on the link member 11 urges the link members and the valve piston and valve rod back to the position illustrated in FIG. 1 after the pressure in reservoir 7 has been reduced to substantially ambient pressure. The high pressure gas source on the ship can then be activated or coupled to line 9 so as to repressurize the reservoir. The lines 15A through which electrical current is conducted to solenoid 15 can be connected to a break switch on the seismic recording apparatus on board ship so as to provide a reference time for seismic observations.

Figure 2:
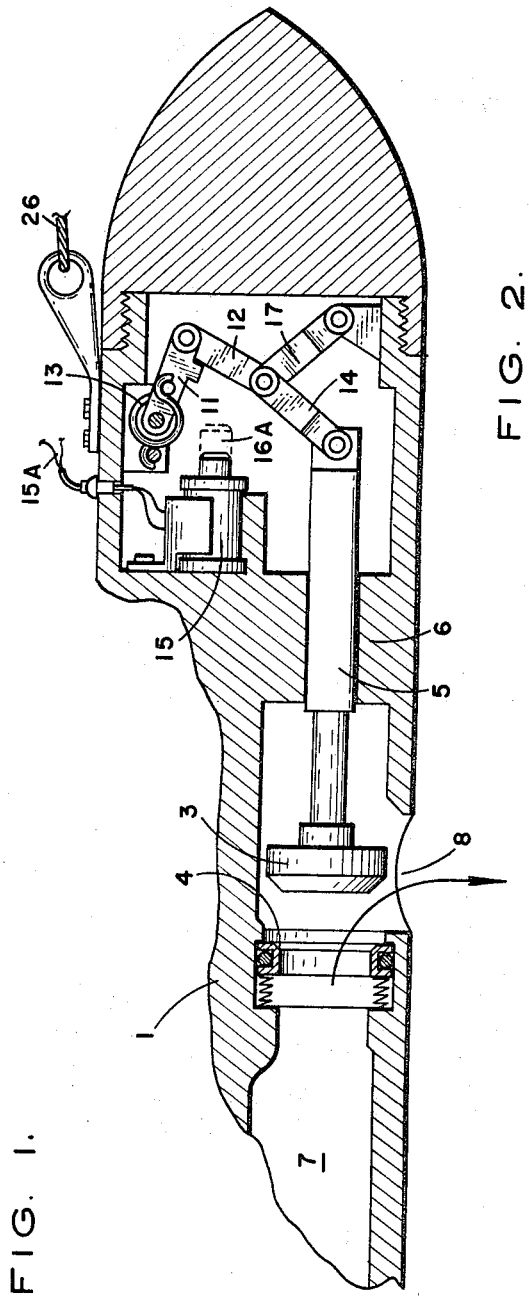
FIG. 2 is a view similar to FIG. 1, illustrating the other operative position of the apparatus of FIG. 1.

As illustrated in FIG. 2, housing 1 is provided with a tow line 26. The electrical leads 15A and high pressure line 9 leading to the ship may be supported by the tow line 9. A string of hydrophones or geophones 25 will ordinarily stream behind the ship 31 on a seismic cable 27 in the usual manner.

Although the embodiment of the invention disclosed in the preceding specification is preferred, other modifications will be apparent to those skilled in the art which do not depart from the scope of the broadest aspects of the invention.

What is claimed is:
1. A submarine seismic source comprising:
a housing including a reservoir for pressurized gas;
port means opening to the exterior of said housing;
means including valve means for selectively connecting the interior of said reservoir to said port;
said valve means including a valve seat and a valve piston for seating on said valve seat to close fluid communication between the interior of said reservoir and said port;
a piston rod connected to said valve piston;
electrically actuatable solenoid means having a movable armature; and
an overtravel locking linkage means connected to said piston rod and to said housing for holding said valve piston on said valve seat against the pressure of gas in said reservoir when in he overtravel position thereof and to collapse to open said valve means when pushed away from said overtravel position, said armature being positioned to push said linkage away from said overtravel position.

2. The apparatus of claim 1 further including spring means for urging said linkage means against said armature.

3. The apparatus of claim 1 further including a high pressure line for towing said housing from a ship, and check valve means connecting said line to said reservoir.

4. The apparatus of claim 1 wherein said overtravel locking linkage means includes:

first and second link members pivotally connected together and respectively pivotally connected to said piston rod and to said housing, to urge said valve piston against said valve seat when in a predetermined extended position thereof; and third and fourth pivotally connected link members respectively connected to said pivotal connection of said first and second link members and to said housing for urging said first and second link members to said predetermined extended position thereof when in a straight line position, and wherein the armature of said solenoid means engages one of said third and fourth link members to hold said third and fourth link members substantially in said straight line position, and by energization of said solenoid to push said third and fourth link members away from said straight line position.

References Cited
UNITED STATES PATENTS

| | | | |
|---|---|---|---|
| 3,249,177 | 5/1966 | Chelminski | 181—0.5 |
| 3,276,534 | 10/1966 | Ewing et al. | 181—0.5 |
| 3,289,784 | 12/1966 | Cassand et al. | 181—0.5 |

BENJAMIN A. BORCHELT, *Primary Examiner.*

W. KUJAWA, *Assistant Examiner.*